May 14, 1935. T. C. BURROWS 2,001,654
ANGLE INDICATOR
Filed Sept. 17, 1934
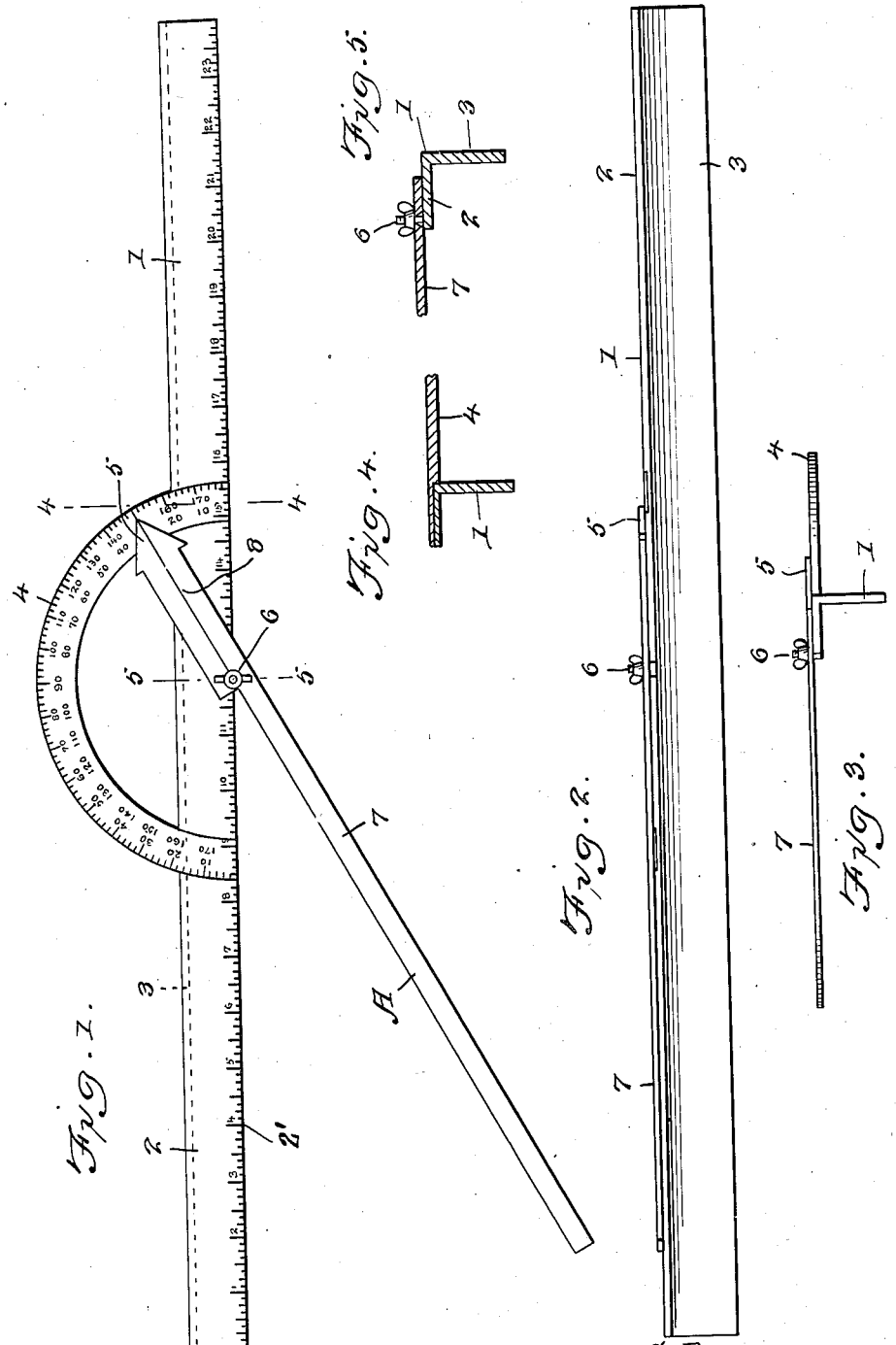
Thomas C. Burrows INVENTOR
BY Victor J. Evans & Co.
ATTORNEY Patented May 14, 1935

2,001,654

UNITED STATES PATENT OFFICE 2,001,654

ANGLE INDICATOR

Thomas C. Burrows, Wink, Tex.

Application September 17, 1934, Serial No. 744,407

1 Claim. (Cl. 33—93)

This invention relates to measuring instruments and has for the primary object the provision of a device of this character which will provide a combined protractor and T bevel whereby figuring and laying out of angles may be accurately accomplished and is constructed to be used on varying sizes of work and provides an efficient straight edge to abut the work so that alignment may be easily made.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a plan view illustrating an angle indicator constructed in accordance with my invention.

Figure 2 is a side elevation illustrating the same.

Figure 3 is an end view illustrating the device.

Figure 4 is a sectional view taken on the line 4—4 of Figure 1.

Figure 5 is a sectional view taken on the line 5—5 of Figure 1.

Referring in detail to the drawing, the numeral 1 indicates a member of angle iron construction presenting portions 2 and 3. The free edge of the portion 2 is provided with a scale 2' representing twenty-four inches for making measurements as to lengths or widths of work and at spaced intervals upon the outer face of the portion 2 recesses are provided in which ends of an arcuate-shaped plate 4 are secured. The end portions 4 are reduced in thickness so that when positioned in the recesses of the portion 2, the outer face of the plate will be flush with the outer face of the portion 2.

The face of the plate has a protractor scale of 180 degrees, as clearly shown in Figure 1, and operating over the plate 4 is a pointer 5 pivoted to the member 1, as shown at 6. A tail piece 7 is formed integral with the pivoted end of the indicator 5 and is approximately one-half the width of the pointer and said pointer is provided with a dividing line 8 extending from the pivot 6 to the free end of the pointer. The line 8 divides the pointer in equal parts and the line 8 is in alignment with the edge A of the tail piece. The pivot 6 is in the form of a bolt having a wing nut, the head of the bolt being countersunk, as shown in Figure 5. By releasing the wing nut on the bolt the pointer 5 may be swung over the protractor plate 4, thus positioning the tail piece 7 at a given angle with the scale edge of the portion 2 of the member 1. The pivot 6 is located on the member 1 intermediate the ends of the protractor plate 4. The portion 3 of the member 1 provides a straight edge for abutting work.

Having described the invention, I claim:

A device of the character set forth comprising an angle iron member providing portions arranged at right angles to each other, one of said portions at its free edge having a scale of twenty-four inches, said member having recesses, an arcuately curved protractor plate secured in said recesses and provided with a protractor scale, an indicator pivoted in said member and movable over the protractor plate, a tail piece integral with the pivoted end of the indicator and of a width equal to one-half of the width of the indicator, said other portion of the tail piece providing a straight edge.

THOMAS C. BURROWS.